United States Patent
Tang et al.

(10) Patent No.: US 11,297,820 B1
(45) Date of Patent: Apr. 12, 2022

(54) MULTILEVEL COOPERATION-BASED UNMANNED AERIAL VEHICLE SPRAYING OPERATION METHOD AND DEVICE

(71) Applicant: Guangdong Polytechnic Normal University, Guangzhou (CN)

(72) Inventors: Yu Tang, Guangzhou (CN); Shaoming Luo, Guangzhou (CN); Qiwei Guo, Guangzhou (CN); Xincai Zhuang, Guangzhou (CN); Huasheng Huang, Guangzhou (CN); Xing Zhu, Guangzhou (CN); Jiahao Li, Guangzhou (CN); Jiepeng Yang, Guangzhou (CN); Yiqing Fu, Guangzhou (CN); Chaojun Hou, Guangzhou (CN); Jiajun Zhuang, Guangzhou (CN); Aimin Miao, Guangzhou (CN); Xuan Chu, Guangzhou (CN)

(73) Assignee: GUANGDONG POLYTECHNIC NORMAL UNIVERSITY, Guangzhou (CN)

( * ) Notice: Subject to any disclaimer, the term of this patent is extended or adjusted under 35 U.S.C. 154(b) by 0 days.

(21) Appl. No.: 17/222,805

(22) Filed: Apr. 5, 2021

(30) Foreign Application Priority Data

Nov. 24, 2020 (CN) .......................... 202011326484.0

(51) Int. Cl.
*A01M 7/00* (2006.01)
*B64C 39/02* (2006.01)
(Continued)

(52) U.S. Cl.
CPC ......... *A01M 7/0089* (2013.01); *B64C 39/024* (2013.01); *B64D 1/16* (2013.01);
(Continued)

(58) Field of Classification Search
CPC .. A01M 7/0089; B64C 39/02; B64C 2201/12; B64D 1/16; G06N 3/04; G06N 3/08
See application file for complete search history.

(56) References Cited

U.S. PATENT DOCUMENTS

2019/0302770 A1* 10/2019 Tanaka ................. G06V 20/176

* cited by examiner

*Primary Examiner* — Michael D Lang
(74) *Attorney, Agent, or Firm* — Getech Law LLC; Jun Ye (57) ABSTRACT

The present application discloses a multilevel cooperation-based unmanned aerial vehicle spraying operation method. The method includes: acquiring a first sensing signal set; inputting the first sensing signal set into a prescription map generation model to acquire a first prescription map; generating the type of liquid medicine and corresponding quantity required by a to-be-treated plant, and selecting a specified unmanned aerial vehicle; transmitting a start instruction to make the specified unmanned aerial vehicle fly to an initial position; acquiring a second sensing signal set; inputting a motion parameter and a position parameter of the unmanned aerial vehicle, the remaining liquid storage quantity of the plurality of liquid medicine storage tanks and the second sensing signal set into a spraying strategy generation module for processing to acquire a first spraying strategy; performing aerial spraying operation performing cooperative ground spraying operation to realize multilevel fine spraying operation based on the prescription map.

6 Claims, 2 Drawing Sheets (51) Int. Cl.
*G06N 3/04* (2006.01)
*G06N 3/08* (2006.01)
*B64D 1/16* (2006.01)

(52) U.S. Cl.
CPC ............... *G06N 3/04* (2013.01); *G06N 3/08* (2013.01); *B64C 2201/12* (2013.01)

MULTILEVEL COOPERATION-BASED UNMANNED AERIAL VEHICLE SPRAYING OPERATION METHOD AND DEVICE

TECHNICAL FIELD

The present application relates to the field of computers, and in particular, to a multilevel cooperation-based unmanned aerial vehicle spraying operation method and device, a computer device and a storage medium.

BACKGROUND

Unmanned aerial vehicles, such as pesticide spraying unmanned aerial vehicles, have been applied in the field of agriculture (for example, applied to spraying operation). At present, the spraying unmanned aerial vehicles are used for spraying operation. Generally, the spraying unmanned aerial vehicles carry liquid medicine into the air, and fly and perform spraying operation according to a preset program until the liquid medicine is used up; therefore, the existing spraying unmanned aerial vehicles have low intelligence degree, low spraying accuracy and poor spraying effect.

SUMMARY

The present application provides a multilevel cooperation-based unmanned aerial vehicle spraying operation method, including the following steps:

S1: acquiring a first sensing signal set transmitted by a touring robot on an overhead transmission line, wherein the first sensing signal set is acquired by performing signal acquisition on a preset specified space area by a preset first sensor array on the touring robot, to-be-treated plants are planted in the specified space area, and the minimum height of the touring robot on the overhead transmission line is greater than the maximum height of all the to-be-treated plants in the specified space area;

S2: inputting the first sensing signal set into a preset prescription map generation model based on a convolutional neural network for processing so as to acquire a first prescription map output by the prescription map generation model, wherein an initial position is marked in the first prescription map, the prescription map generation model is formed by training first training data collected in advance, the first training data consists of a first sensing signal set for training, a manually marked prescription map corresponding to the first sensing signal set for training and a manually marked initial position, and the first sensing signal set for training is acquired by a sensor array on the touring robot on the overhead transmission line;

S3: generating the types of liquid medicine and the corresponding quantity required by the to-be-treated plants according to the first prescription map, and selecting a specified unmanned aerial vehicle from a preset unmanned aerial vehicle group according to the types of liquid medicine and the corresponding quantity required by the to-be-treated plants, wherein the specified unmanned aerial vehicle is applied to aerial spraying operation and is provided with liquid medicine spraying equipment and a plurality of liquid medicine storage tanks, and the number of the plurality of liquid medicine storage tanks is as same as that of the liquid medicine types;

S4: transmitting an enabled instruction to a preset unmanned aerial vehicle terminal, such that the unmanned aerial vehicle terminal controls the specified unmanned aerial vehicle to take off to an initial position in a real space corresponding to the initial position marked in the first prescription map;

S5: starting a preset second sensor array on the specified unmanned aerial vehicle to perform signal acquisition on the specified space area so as to acquire a second sensing signal set;

S6: acquiring a motion parameter and a position parameter of the specified unmanned aerial vehicle and the remaining liquid storage quantity of the plurality of liquid medicine storage tanks, and inputting the motion parameter, the position parameter, the remaining liquid storage quantity of the plurality of liquid medicine storage tanks and the second sensing signal set into a preset spraying strategy generation model based on a BP neural network for processing so as to acquire a first spraying strategy output by the spraying strategy generation model, wherein the spraying strategy generation model is formed by training second training data collected in advance, the second training data consists of a motion parameter and a position parameter of the unmanned aerial vehicle for training, the remaining liquid storage quantity of the plurality of preset liquid medicine storage tanks on the unmanned aerial vehicle for training, a second sensing signal set for training and a corresponding manually marked spraying strategy, the second sensing signal set for training is acquired by a preset sensor array on the unmanned aerial vehicle for training, the first spraying strategy comprises a first aerial spraying sub-strategy and a first ground vehicle spraying sub-strategy, the first aerial spraying sub-strategy at least comprises an unmanned aerial vehicle flight speed changing over time, a flight position changing over time, parameters of liquid medicine spraying equipment changing over time and opening control parameters of the plurality of liquid medicine storage tanks changing over time;

S7: controlling the specified unmanned aerial vehicle to perform aerial spraying operation on the specified space area according to the first aerial spraying sub-strategy, wherein the minimum height of the touring robot on the overhead transmission line is greater than the maximum height of the specified unmanned aerial vehicle during aerial spraying operation; and S8: controlling a preset spraying vehicle to perform cooperative ground spraying operation on the specified space area according to the first ground vehicle spraying sub-strategy so as to complete multilevel cooperative spraying operation.

Further, before the step S2: inputting the first sensing signal set into a preset prescription map generation model based on a convolutional neural network for processing so as to acquire a first prescription map output by the prescription map generation model, wherein an initial position is marked in the first prescription map, the prescription map generation model is formed by training first training data collected in advance, the first training data consists of a first sensing signal set for training, a manually marked prescription map corresponding to the first sensing signal set for training and a manually marked initial position, and the first sensing signal set for training is acquired by a sensor array on the touring robot on the overhead transmission line, the method includes: S11: transferring a specified amount of sample data from a preset sample database to form a sample set, wherein the sample data consists of a sensing signal set for training, a corresponding manually marked prescription map and a manually marked initial position, the sensing signal set for training in the training data is acquired by performing signal acquisition process on a training area where plants are planted in advance by a high-altitude sensor array, and the high-altitude sensor array refers to a sensor array with a height greater than that of the plants in the training area during signal acquisition processing;

S12: dividing the sample set into a training set and a verification set according to a preset ratio;

S13: invoking a preset convolutional neural network model and inputting the training set into the convolutional neural network model for training so as to acquire an preliminary model;

S14: performing verification processing on the preliminary model by the verification set and judging whether the verification result is pass; and S15: if the verification result is pass, recording the preliminary model as a prescription map generation model.

Further, the first prescription map consists of a plurality of spraying areas, wherein each spraying area is correspondingly marked with the type of to-be-sprayed liquid medicine and the quantity of the to-be-sprayed liquid medicine. The step S3: generating the types of liquid medicine and the corresponding quantity required by the to-be-treated plants according to the first prescription map, and selecting a specified unmanned aerial vehicle from a preset unmanned aerial vehicle group according to the types of liquid medicine and the corresponding quantity required by the to-be-treated plants, wherein the specified unmanned aerial vehicle is applied to aerial spraying operation and is provided with liquid medicine spraying equipment and a plurality of liquid medicine storage tanks, and the number of the plurality of liquid medicine storage tanks is as same as that of the liquid medicine types, includes: S301: dividing the plurality of spraying areas in the first prescription area into a plurality of upper-layer areas and a plurality of lower-layer areas, wherein the minimum height of the contour of the upper-layer areas is greater than a preset reference height, and other areas except for the upper-layer areas in the plurality of spraying areas in the first prescription map are the lower-layer areas;

S302: constructing a first prescription sub-map only consisting of the plurality of upper-layer areas; and S303: generating the types of liquid medicine and the corresponding quantity required by the to-be-treated plants in the first prescription sub-map, and selecting a specified unmanned aerial vehicle from all the unmanned aerial vehicles in a distance away from the specified space area not exceeding a first preset distance, the specified unmanned aerial vehicle being applied to aerial spraying operation and being provided with liquid medicine spraying equipment and a plurality of liquid medicine storage tanks, the number of the plurality of liquid medicine storage tanks being as same as that of the liquid medicine types, and the remaining liquid storage quantity being correspondingly greater than the corresponding quantity of the types of the liquid medicine required by the to-be-treated plants in the first prescription sub-map.

Further, the step S7: controlling the specified unmanned aerial vehicle to perform aerial spraying operation on the specified space area according to the first aerial spraying sub-strategy, wherein the minimum height of the touring robot on the overhead transmission line is greater than the maximum height of the specified unmanned aerial vehicle during aerial spraying operation, includes:

S701: controlling the specified unmanned aerial vehicle to perform aerial spraying operation on the plurality of upper-layer areas according to the first aerial spraying sub-strategy, the minimum height of the touring robot on the overhead transmission line being greater than the maximum height of the specified unmanned aerial vehicle during aerial spraying operation;

S702: after performing aerial spraying operation on all the upper-layer areas, judging whether the remaining liquid storage quantity of the plurality of liquid medicine storage tanks on the specified unmanned aerial vehicle is less than a preset liquid storage quantity threshold; and S703: if the remaining liquid storage quantity of the plurality of liquid medicine storage tanks on the specified unmanned aerial vehicle is less than a preset liquid storage quantity threshold, generating a ground spraying instruction, the ground spraying instruction being configured to indicate a spraying vehicle to perform spraying operation.

The step S8: controlling a preset spraying vehicle to perform cooperative ground spraying operation on the specified space area according to the first ground vehicle spraying sub-strategy so as to complete multilevel cooperative spraying operation, includes:

S801: controlling a preset spraying vehicle to perform cooperative ground spraying operation on the plurality of lower-layer areas according to the first ground vehicle spraying sub-strategy so as to complete multilevel cooperative spraying operation.

Further, the second sensor array consists of a visible light sensor sub-array, a millimeter-wave radar sub-array and a laser radar sub-array. The step S5: starting a preset second sensor array on the specified unmanned aerial vehicle to perform signal acquisition on the specified space area so as to acquire a second sensing signal set, includes:

S501: starting a preset light generator on the specified unmanned aerial vehicle to irradiate the specified space area with visible light, and starting a preset visible light sensor sub-array on the specified unmanned aerial vehicle to perform signal acquisition on the specified space area so as to acquire a second visible light signal set;

S502: starting a preset millimeter-wavy radar sub-array on the specified unmanned aerial vehicle to perform signal acquisition on the specified space area so as to acquire a second millimeter-wave radar signal set;

S503: starting a preset laser radar sub-array on the specified unmanned aerial vehicle to perform signal acquisition on the specified space area so as to acquire a second laser radar signal set; and S504: integrating the second visible light signal set, the second millimeter-wave radar signal set and the second laser radar signal into a second sensing signal set.

The present application provides a multilevel cooperation-based unmanned aerial vehicle spraying operation device, including:

a first sensing signal set acquisition unit, configured to acquire a first sensing signal set transmitted by a touring robot on an overhead transmission line, wherein the first sensing signal set is acquired by performing signal acquisition on a preset specified space area by a preset first sensor array on the touring robot, to-be-treated plants are planted in the specified space area, and the minimum height of the touring robot on the overhead transmission line is greater than the maximum height of all the to-be-treated plants in the specified space area;

a first prescription map acquisition unit, configured to input the first sensing signal set into a preset prescription map generation model based on a convolutional neural network for processing so as to acquire a first prescription map output by the prescription map generation model, wherein an initial position is marked in the first prescription map, the prescription map generation model is formed by training first training data collected in advance, the first training data consists of a first sensing signal set for training, a manually marked prescription map corresponding to the first sensing signal set for training and a manually marked initial position, and the first sensing signal set for training is acquired by a sensor array on the touring robot on the overhead transmission line;

a specified unmanned aerial vehicle selection unit, configured to generate the types of liquid medicine and the corresponding quantity required by the to-be-treated plants according to the first prescription map, and selecting a specified unmanned aerial vehicle from a preset unmanned aerial vehicle group according to the types of liquid medicine and the corresponding quantity required by the to-be-treated plants, wherein the specified unmanned aerial vehicle is applied to aerial spraying operation and is provided with liquid medicine spraying equipment and a plurality of liquid medicine storage tanks, and the number of the plurality of liquid medicine storage tanks is as same as that of the liquid medicine types;

a start instruction transmitting unit, configured to transmit a start instruction to a preset unmanned aerial vehicle terminal, such that the unmanned aerial vehicle terminal controls the specified unmanned aerial vehicle to take off to an initial position in a real space corresponding to the initial position marked in the first prescription map;

a second sensing signal set acquisition unit, configured to start a preset second sensor array on the specified unmanned aerial vehicle to perform signal acquisition on the specified space area so as to acquire a second sensing signal set;

a first spraying strategy acquisition unit, configured to acquire a motion parameter and a position parameter of the specified unmanned aerial vehicle and the remaining liquid storage quantity of the plurality of liquid medicine storage tanks, and input the motion parameter, the position parameter, the remaining liquid storage quantity of the plurality of liquid medicine storage tanks and the second sensing signal set into a preset spraying strategy generation model based on a BP neural network for processing so as to acquire a first spraying strategy output by the spraying strategy generation model, wherein the spraying strategy generation model is formed by training second training data collected in advance, the second training data consists of a motion parameter and a position parameter of the unmanned aerial vehicle for training, the remaining liquid storage quantity of the plurality of preset liquid medicine storage tanks on the unmanned aerial vehicle for training, a second sensing signal set for training and a corresponding manually marked spraying strategy, the second sensing signal set for training is acquired by a preset sensor array on the unmanned aerial vehicle for training, the first spraying strategy comprises a first aerial spraying sub-strategy and a first ground vehicle spraying sub-strategy, the first aerial spraying sub-strategy at least comprises an unmanned aerial vehicle flight speed changing over time, a flight position changing over time, parameters of liquid medicine spraying equipment changing over time and opening control parameters of the plurality of liquid medicine storage tanks changing over time;

an aerial spraying operation unit, configured to control the specified unmanned aerial vehicle to perform aerial spraying operation on the specified space area according to the first aerial spraying sub-strategy, wherein the minimum height of the touring robot on the overhead transmission line is greater than the maximum height of the specified unmanned aerial vehicle during aerial spraying operation; and a ground spraying operation unit, configured to control a preset spraying vehicle to perform cooperative ground spraying operation on the specified space area according to the first ground vehicle spraying sub-strategy so as to complete multilevel cooperative spraying operation.

The present application provides a computer device. The computer device includes a memory and a processor, wherein the memory stores a computer program, and the processor implements the steps of any one of the above methods when executing the computer program.

The present invention provides a computer readable storage medium. A computer program is stored in the computer readable storage medium and enables the processor to implement the steps of any one of the above methods when being executed by the processor.

According to the multilevel cooperation-based unmanned aerial vehicle spraying operation method and device, the computer device and the storage medium provided by the present application, multilevel cooperation is realized, intelligent cooperative spraying operation is completed, and the spraying effect is excellent. The multilevel cooperation in the multilevel cooperation-based unmanned aerial vehicle spraying operation method provided by the present application includes multilevel cooperation (cooperation during spraying operation and cooperation during signal acquisition), specifically:

In the overall implementation process of the present application, there is cooperation among the touring robot on the overhead transmission line, the unmanned aerial vehicle and the ground spraying vehicle; that is, the cooperation between the touring robot on the overhead transmission line and the unmanned aerial vehicle further includes cooperation between different heights (the signal acquisition height of the touring robot is greater than the signal acquisition height of the unmanned aerial vehicle); and the cooperation between the unmanned aerial vehicle spraying and the ground vehicle spraying similarly includes cooperation between different heights (aerial spraying and ground spraying). Therefore, the accurate cooperative spraying of the present application is realized by the multilevel cooperation and the intelligent analysis technology used in the process. The executive body of the present application may be any feasible body, such as a server for spraying arranged on the ground, etc.

Furthermore, the present application adopts a BP neural network to design an air borne spraying flow self-adaptive adjusting device, and establishes a medicine storage quantity calculation model which associates with and weighs a relationship among the liquid medicine storage quantity, output power of a boosting pump (spraying equipment parameter) and the spraying flow, thus realizing self-adaptive adjustment of the spraying flow under different medicine storage quantity and improving the consistence of medicine spraying. Meanwhile, combined with measured data of the growth status, the nutritional status and the pest and disease status of the plants acquired by the unmanned aerial vehicle, an unmanned aerial vehicle pesticide accurate spraying method based on measured information is realized, an intelligent spraying decision-making system integrating operation parameters (spraying equipment parameters) such as flight speed, flight height, spraying flow, spray head direction and the like is constructed, and accurate variable application of the unmanned aerial vehicle based on the prescription map is realized.

In addition, the present application specially utilizes the touring robot on the overhead transmission line. The touring robot on the overhead transmission line is configured to perform touring detection on the overhead transmission line to determine the status of the overhead transmission line, which must rely on the overhead transmission line to realize touring movement. However, the present application utilizes the first sensor array (such as an image sensor array) of the touring robot to acquire a first sensing signal, such that signal acquisition at high altitude without additional cost is realized, the subsequent selection and spraying of the unmanned aerial vehicle have an analytical basis, and the unnecessary cost of sending the unmanned aerial vehicle for pure surveillance is avoided.

The implementation of objectives, functional characteristics, and advantages of the present application will be further described with reference to the accompanying drawings.

DETAILED DESCRIPTION OF THE EMBODIMENTS

To make the objectives, technical solutions, and advantages of the present application clearer, the present application is further described below in detail with reference to the accompanying drawings and embodiments. It should be understood that the specific embodiments described herein are only for explaining the present application, rather than for limiting the present application.

Figure 1:
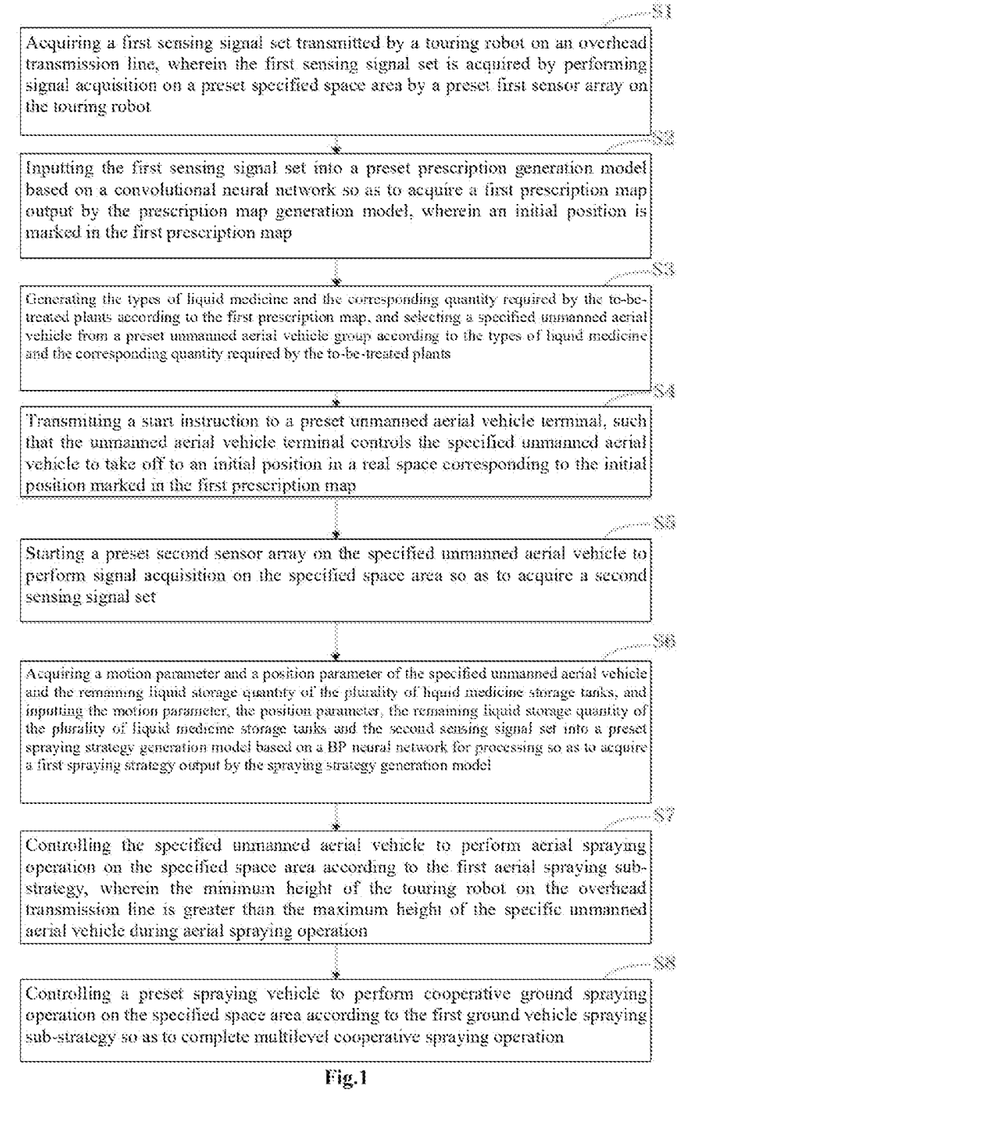
FIG. 1 is a schematic flow chart of a multilevel cooperation-based unmanned aerial vehicle spraying operation method according to an embodiment of the present application.

Referring to FIG. 1, the embodiment of the present application provides a multilevel cooperation-based unmanned aerial vehicle spraying operation method, including the following step:

S1: a first sensing signal set transmitted by a touring robot on an overhead transmission line is acquired, wherein the first sensing signal set is acquired by performing signal acquisition on a preset specified space area by a preset first sensor array on the touring robot, to-be-treated plants are planted in the specified space area, and the minimum height of the touring robot on the overhead transmission line is greater than the maximum height of all the to-be-treated plants in the specified space area;

S2: the first sensing signal set is input into a preset prescription map generation model based on a convolutional neural network for processing so as to acquire a first prescription map output by the prescription map generation model, wherein an initial position is marked in the first prescription map, the prescription map generation model is formed by training first training data collected in advance, the first training data consists of a first sensing signal set for training, a manually marked prescription map corresponding to the first sensing signal set for training and a manually marked initial position, and the first sensing signal set for training is acquired by a sensor array on the touring robot on the overhead transmission line;

S3: the types of liquid medicine and the corresponding quantity required by the to-be-treated plants are generated according to the first prescription map, and a specified unmanned aerial vehicle is selected from a preset unmanned aerial vehicle group according to the types of liquid medicine and the corresponding quantity required by the to-be-treated plants, wherein the specified unmanned aerial vehicle is applied to aerial spraying operation and is provided with liquid medicine spraying equipment and a plurality of liquid medicine storage tanks, and the number of the plurality of liquid medicine storage tanks is as same as that of the liquid medicine types;

S4: a start instruction is transmitted to a preset unmanned aerial vehicle terminal, such that the unmanned aerial vehicle terminal controls the specified unmanned aerial vehicle to take off to an initial position in a real space corresponding to the initial position marked in the first prescription map;

S5: a preset second sensor array on the specified unmanned aerial vehicle is started to perform signal acquisition on the specified space area so as to acquire a second sensing signal set;

S6: a motion parameter and a position parameter of the specified unmanned aerial vehicle and the remaining liquid storage quantity of the plurality of liquid medicine storage tanks are acquired, and the motion parameter, the position parameter, the remaining liquid storage quantity of the plurality of liquid medicine storage tanks and the second sensing signal set are input into a preset spraying strategy generation model based on a BP neural network for processing so as to acquire a first spraying strategy output by the spraying strategy generation model, wherein the spraying strategy generation model is formed by training second training data collected in advance, the second training data consists of a motion parameter and a position parameter of the unmanned aerial vehicle for training, the remaining liquid storage quantity of the plurality of preset liquid medicine storage tanks on the unmanned aerial vehicle for training, a second sensing signal set for training and a corresponding manually marked spraying strategy, the second sensing signal set for training is acquired by a preset sensor array on the unmanned aerial vehicle for training, the first spraying strategy comprises a first aerial spraying sub-strategy and a first ground vehicle spraying sub-strategy, the first aerial spraying sub-strategy at least comprises an unmanned aerial vehicle flight speed changing over time, a flight position changing over time, parameters of liquid medicine spraying equipment changing over time and opening control parameters of the plurality of liquid medicine storage tanks changing over time;

S7: the specified unmanned aerial vehicle is controlled to perform aerial spraying operation on the specified space area according to the first aerial spraying sub-strategy, wherein the minimum height of the touring robot on the overhead transmission line is greater than the maximum height of the specified unmanned aerial vehicle during aerial spraying operation; and S8: a preset spraying vehicle is controlled to perform cooperative ground spraying operation on the specified space area according to the first ground vehicle spraying sub-strategy so as to complete multilevel cooperative spraying operation.

As described in the steps S1-S2, S1: a first sensing signal set transmitted by a touring robot on an overhead transmission line is acquired, wherein the first sensing signal set is acquired by performing signal acquisition on a preset specified space area by a preset first sensor array on the touring robot, to-be-treated plants are planted in the specified space area, and the minimum height of the touring robot on the overhead transmission line is greater than the maximum height of all the to-be-treated plants in the specified space area; and S2: the first sensing signal set is input into a preset prescription map generation model based on a convolutional neural network for processing so as to acquire a first prescription map output by the prescription map generation model, wherein an initial position is marked in the first prescription map, the prescription map generation model is formed by training first training data collected in advance, the first training data consists of a first sensing signal set for training, a manually marked prescription map corresponding to the first sensing signal set for training and a manually marked initial position, and the first sensing signal set for training is acquired by a sensor array on the touring robot on the overhead transmission line. The touring robot on the overhead transmission line is specific robot for performing touring detection on the overhead transmission line, and is provided with a first sensor array, such as an image sensor array (such as a camera array, etc.). The touring robot adopts periodical touring detection and is located at high altitude; therefore, in the present application, the first sensor array is specially used for performing preliminary signal acquisition. At this time, since the touring robot is the highest (compared with the subsequent unmanned aerial vehicle, plants, vehicles, etc.), the acquired signal is more beneficial overall analysis to generate a preliminary prescription map. The prescription map refers to an image consisting of a plurality of areas (including to-be-treated plants). The types of to-be-sprayed liquid medicine and the corresponding quantity are marked in each area in the image. The first sensing signal set is input into a preset prescription map generation model based on a convolutional neural network for processing so as to acquire a first prescription map output by the prescription map generation map. It should be noted that an initial position is marked on the first prescription map of the present application, which is a characteristic of the present application. The present application relates to unmanned aerial vehicle spraying, and the unmanned aerial vehicle spraying is not mechanical spraying according to a preset program, but fine spraying according to the real environmental condition; therefore, the unmanned aerial vehicle needs to perform data acquisition and analysis again, and where the unmanned aerial vehicle performs data acquisition will affect the final spraying effect. Therefore, the prescription map generation model of the present application is formed by training first training data collected in advance, the first training data consists of a first sensing signal set for training, a manually marked prescription map corresponding to the first sensing signal set for training and a manually marked initial position, and the first sensing signal set for training is acquired by a sensor array on the touring robot on the overhead transmission line. Consequently, the prescription map generation model can be competent for the output task of the prescription map, and the initial position is marked on the output prescription map, such that the spraying accuracy is improved.

Further, before the step S2: the first sensing signal set is input into a preset prescription map generation model based on a convolutional neural network for processing so as to acquire a first prescription map output by the prescription map generation model, wherein an initial position is marked in the first prescription map, the prescription map generation model is formed by training first training data collected in advance, the first training data consists of a first sensing signal set for training, a manually marked prescription map corresponding to the first sensing signal set for training and a manually marked initial position, and the first sensing signal set for training is acquired by a sensor array on the touring robot on the overhead transmission line, the method includes: S11: a specified amount of sample data is transferred from a preset sample database to form a sample set, wherein the sample data consists of a sensing signal set for training, a corresponding manually marked prescription map and a manually marked initial position, the sensing signal set for training in the training data is acquired by performing signal acquisition process on a training area where plants are planted in advance by a high-altitude sensor array, and the high-altitude sensor array refers to a sensor array with a height greater than that of the plants in the training area during signal acquisition processing;

S12: the sample set is divided into a training set and a verification set according to a preset ratio;

S13: a preset convolutional neural network model is invoked and the training set is input into the convolutional neural network model for training so as to acquire an preliminary model;

S14: the preliminary model is subjected to verification processing by the verification set and whether the verification result is pass is judged; and S15: if the verification result is pass, the preliminary model is recorded as a prescription map generation model.

Therefore, model training is realized to acquire a prescription map generation model meeting requirements. The specified number is, for example, 5000-1000000. The more the number of the sample data is, the more accurate the model acquired by training is. In addition, to prevent the shortage of the training data, the sample data of the present application is acquired by the sensor array on the high-altitude touring robot, specifically, the sample data is acquired by performing signal acquisition processing on the training area where plants are planted in advance by the high-altitude sensor array. The high-altitude sensor array refers to a sensor array with a height greater than that of the plants in the training area during signal acquisition processing, such that the number of the sample data is increased to avoid the possibility that the model obtained by training cannot meet the requirement caused by the shortage of the sample data. The sensing signal set for training is, for example, an image sensing signal set, and the convolutional neural network model is particularly suitable for analyzing, identifying or classifying the image sensing signal set. The training set is used for training. The verification set is used for performing verification processing on the preliminary model and judging whether the verification result is pass. If the verification result is pass, the preliminary model is recorded as a prescription map generation model, such that a prescription map generation model competent for the task of outputting the prescription map is acquired.

As described in the steps S3-S4, S3: the types of liquid medicine and the corresponding quantity required by the to-be-treated plants are generated according to the first prescription map, and a specified unmanned aerial vehicle is selected from a preset unmanned aerial vehicle group according to the types of liquid medicine and the corresponding quantity required by the to-be-treated plants, wherein the specified unmanned aerial vehicle is applied to aerial spraying operation and is provided with liquid medicine spraying equipment and a plurality of liquid medicine storage tanks, and the number of the plurality of liquid medicine storage tanks is as same as that of the liquid medicine types; and S4: a start instruction is transmitted to a preset unmanned aerial vehicle terminal, such that the unmanned aerial vehicle terminal controls the specified unmanned aerial vehicle to take off to an initial position in a real space corresponding to the initial position marked in the first prescription map. The types and quantity of the liquid medicine needing to be sprayed in each area are marked on the first prescription map, and the specific unmanned aerial vehicle capable of performing corresponding spraying may be selected according to the types and quantity of the liquid medicine, that is, the specified unmanned aerial vehicle is applied to aerial spraying operation and is provided with liquid medicine spraying equipment and a plurality of liquid medicine storage tanks, wherein the number of the plurality of liquid medicine storage tanks is as same as that of the liquid medicine types. The preset unmanned aerial vehicle group includes any feasible unmanned aerial vehicle, for example, the unmanned aerial vehicle that has not taken off yet, or the unmanned aerial vehicle that has performed aerial spraying operation, but the remaining liquid medicine quantity is still enough for the unmanned aerial vehicle to continue the spraying operation. A start instruction is transmitted to the preset unmanned aerial vehicle terminal, such that the unmanned aerial vehicle terminal controls the specified unmanned aerial vehicle to take off to an initial position in a real space corresponding to the initial position marked in the first prescription map. It should be noted that the initial position here is different from the position where the touring robot performs signal acquisition. The initial position is set for the convenience of the unmanned aerial vehicle in signal acquisition. Therefore, if the initial position is as same as the position where the touring robot performs signal acquisition, one-time signal acquisition will be wasted.

Further, the first prescription map consists of a plurality of spraying areas, wherein each spraying area is correspondingly marked with the type of to-be-sprayed liquid medicine and the quantity of the to-be-sprayed liquid medicine. The step S3: the types of liquid medicine and the corresponding quantity required by the to-be-treated plants are generated according to the first prescription map, and a specified unmanned aerial vehicle is selected from a preset unmanned aerial vehicle group according to the types of liquid medicine and the corresponding quantity required by the to-be-treated plants, wherein the specified unmanned aerial vehicle is applied to aerial spraying operation and is provided with liquid medicine spraying equipment and a plurality of liquid medicine storage tanks, and the number of the plurality of liquid medicine storage tanks is as same as that of the liquid medicine types, includes: S301: dividing the plurality of spraying areas in the first prescription area into a plurality of upper-layer areas and a plurality of lower-layer areas, wherein the minimum height of the contour of the upper-layer areas is greater than a preset reference height, and other areas except for the upper-layer areas in the plurality of spraying areas in the first prescription map are the lower-layer areas;

S302: a first prescription sub-map only consisting of the plurality of upper-layer areas is constructed; and S303: the types of liquid medicine and the corresponding quantity required by the to-be-treated plants are generated in the first prescription sub-map, and a specified unmanned aerial vehicle is selected from all the unmanned aerial vehicles in a distance away from the specified space area not exceeding a first preset distance, wherein the specified unmanned aerial vehicle is applied to aerial spraying operation and is provided with liquid medicine spraying equipment and a plurality of liquid medicine storage tanks, the number of the plurality of liquid medicine storage tanks is as same as that of the liquid medicine types, and the remaining liquid storage quantity is correspondingly greater than the corresponding quantity of the types of the liquid medicine required by the to-be-treated plants in the first prescription sub-map.

Therefore, selection of the specified unmanned aerial vehicle is realized. The cooperative spraying solution adopted in the present application makes full use the characteristics that the unmanned aerial vehicle is flexible, efficient and suitable for high-altitude spraying and the spraying vehicle has sufficient medicament; however, the unmanned aerial vehicle has the inherent disadvantages of carrying a small amount of liquid medicine and being expensive. Therefore, how to select the unmanned aerial vehicle and how to perform cooperative spraying operation subsequently are the issues which need to be considered emphatically. According to the present application, the plurality of spraying areas in the first prescription map are divided into a plurality of upper-layer areas and a plurality of lower-layer areas by designing a reference height; the unmanned aerial vehicle that is still in the air and is relatively close (that is, the specific unmanned aerial vehicle is selected from all the unmanned aerial vehicles in a distance away from the specified space area not exceeding a first preset distance) is preferentially selected, thereby efficiently utilizing the unmanned aerial vehicle for many times; moreover, the unmanned aerial vehicle performs high-altitude spraying operation as much as possible to make full use of the advantage of the unmanned aerial vehicle and enlarge the advantage of cooperative spraying.

Further, the step S7: the specified unmanned aerial vehicle is controlled to perform aerial spraying operation on the specified space area according to the first aerial spraying sub-strategy, wherein the minimum height of the touring robot on the overhead transmission line is greater than the maximum height of the specified unmanned aerial vehicle during aerial spraying operation, includes:

S701: the specified unmanned aerial vehicle is controlled to perform aerial spraying operation on the plurality of upper-layer areas according to the first aerial spraying sub-strategy, wherein the minimum height of the touring robot on the overhead transmission line is greater than the maximum height of the specified unmanned aerial vehicle during aerial spraying operation;

S702: after aerial spraying operation is performed on all the upper-layer areas, whether the remaining liquid storage quantity of the plurality of liquid medicine storage tanks on the specified unmanned aerial vehicle is less than a preset liquid storage quantity threshold is judged; and S703: if the remaining liquid storage quantity of the plurality of liquid medicine storage tanks on the specified unmanned aerial vehicle is less than a preset liquid storage quantity threshold, a ground spraying instruction is generated, wherein the ground spraying instruction is configured to indicate a spraying vehicle to perform spraying operation.

The step S8: a preset spraying vehicle is controlled to perform cooperative ground spraying operation on the specified space area according to the first ground vehicle spraying sub-strategy so as to complete multilevel cooperative spraying operation, includes:

S801: a preset spraying vehicle is controlled to perform cooperative ground spraying operation on the plurality of lower-layer areas according to the first ground vehicle spraying sub-strategy so as to complete multilevel cooperative spraying operation.

Therefore, aerial and ground cooperative spraying is realized. At this time, the aerial spraying operation adopted in the present application is based on the principle of giving priority to spraying at high altitude, that is the specified unmanned aerial vehicle is controlled to perform aerial spraying operation on the plurality of upper-layer areas respectively; and after the aerial spraying operation on the plurality of upper-layer areas is completed, the remaining liquid storage quantity of the plurality of liquid medicine storage tanks on the specified unmanned aerial vehicle is less than a preset liquid storage quantity threshold, and the plurality of lower-layer areas are subjected to cooperative ground spraying operation by a ground vehicle spraying mode, such that multilevel cooperative spraying operation is completed. Therefore, the unmanned aerial vehicle is utilized maximally. Further, if the remaining liquid storage quantity of the plurality of liquid medicine storage tanks on the specified unmanned aerial vehicle is greater than the preset liquid storage quantity threshold, the information that spraying operation may be performed again is transmitted to a server, such that the adjacent to-be-sprayed area is continuously sprayed.

As described in the steps S5-S6, S5: a preset second sensor array on the specified unmanned aerial vehicle is started to perform signal acquisition on the specified space area so as to acquire a second sensing signal set; and S6: a motion parameter and a position parameter of the specified unmanned aerial vehicle and the remaining liquid storage quantity of the plurality of liquid medicine storage tanks are acquired, and the motion parameter, the position parameter, the remaining liquid storage quantity of the plurality of liquid medicine storage tanks and the second sensing signal set are input into a preset spraying strategy generation model based on a BP neural network for processing so as to acquire a first spraying strategy output by the spraying strategy generation model, wherein the spraying strategy generation model is formed by training second training data collected in advance, the second training data consists of a motion parameter and a position parameter of the unmanned aerial vehicle for training, the remaining liquid storage quantity of the plurality of preset liquid medicine storage tanks on the unmanned aerial vehicle for training, a second sensing signal set for training and a corresponding manually marked spraying strategy, the second sensing signal set for training is acquired by a preset sensor array on the unmanned aerial vehicle for training, the first spraying strategy comprises a first aerial spraying sub-strategy and a first ground vehicle spraying sub-strategy, the first aerial spraying sub-strategy at least comprises an unmanned aerial vehicle flight speed changing over time, a flight position changing over time, parameters of liquid medicine spraying equipment changing over time and opening control parameters of the plurality of liquid medicine storage tanks changing over time; Since the first sensor array on the touring robot is configured to determine the prescription map, the present application needs to perform fine spraying operation and the first sensor signal set acquired by the first sensor array is not enough to meet the requirements, the present application uses the preset second sensor array on the specified unmanned aerial vehicle to perform signal acquisition on the specified space area, thereby acquiring a second sensing signal set; and the second sensing signal, and the motion parameter and the position parameter of the specified unmanned aerial vehicle as well as the remaining liquid storage quantity of the plurality of liquid medicine storage tanks serve as the basis of fine spraying. Strategy prediction is performed by the spraying strategy generation model base on the BP neural network. The BP neural network is a multilayer feedforward neural network trained according to an error reverse transmission algorithm, takes network error square as a target function and calculates the minimum of the target function by a gradient descent method, which is suitable for spraying strategy prediction of the present application. The first spraying strategy includes a first aerial spraying sub-strategy and a first ground vehicle spraying sub-strategy, and is a set of the whole processing process of performing cooperative spraying on the to-be-treated plants, including control parameters (such as the flight speed of the unmanned aerial vehicle changing over time and the flight position changing over time) in the flight process of the unmanned aerial vehicle, the start control parameters of the liquid medicine storage tanks, the ground vehicle spraying position, the pressure parameter value of the sprayer, etc. The parameter values which should be used in the spraying strategy (such as the start control parameter of the liquid medicine storage tanks, the flight speed of the unmanned aerial vehicle changing over time, etc.) may be predicted by combining the BP neural network with the PID control algorithm. The PID control algorithm is a control algorithm widely used in the automatic control system, and is suitable for automatic control of the unmanned aerial vehicle.

Further, the second sensor array consists of a visible light sensor sub-array, a millimeter-wave radar sub-array and a laser radar sub-array. The step S5: a preset second sensor array on the specified unmanned aerial vehicle is started to perform signal acquisition on the specified space area so as to acquire a second sensing signal set, includes:

S501: a preset light generator on the specified unmanned aerial vehicle is started to irradiate the specified space area with visible light, and a preset visible light sensor sub-array on the specified unmanned aerial vehicle is started to perform signal acquisition on the specified space area so as to acquire a second visible light signal set;

S502: a preset millimeter-wavy radar sub-array on the specified unmanned aerial vehicle is started to perform signal acquisition on the specified space area so as to acquire a second millimeter-wave radar signal set;

S503: a preset laser radar sub-array on the specified unmanned aerial vehicle is started to perform signal acquisition on the specified space area so as to acquire a second laser radar signal set; and S504: the second visible light signal set, the second millimeter-wave radar signal set and the second laser radar signal are integrated into a second sensing signal set.

Therefore, the second sensing signal set is acquired. The second sensing signal set consists of a second visible light signal set, a second millimeter-wave radar signal set and a second laser radar signal set. The ordinary unmanned aerial vehicle only uses the visible light sensor to perform signal acquisition, but the present application adopts three different sensor sub-arrays to form a second sensor array so as to realize more accurate pest detection. Before signal acquisition, the specified area is irradiated with visible light (particularly suitable for spraying operation at night), and then the preset visible light sensor sub-array on the specified unmanned aerial vehicle is started to perform signal acquisition on the specified space area, such that a second visible light signal set is acquired, and at this time, the second visible light signal set serves as a main signal source. The preset millimeter-wave radar sub-array on the unmanned aerial vehicle is started to perform signal acquisition on the specified space area, such that a second millimeter-wave radar signal set is acquired. It should be noted that the second millimeter-wave radar signal set is acquired after irradiation with visible light, and after irradiation with visible light, due to the sensitivity of winged insects to light (especially at night), there will be part of winged insects flying in the air. At this time, millimeter-wave radar signal acquisition is performed, such that more signals can be captured by the high ability of the millimeter-wave radar to capture moving objects. The preset laser radar sub-array on the specified unmanned aerial vehicle is started to perform signal acquisition on the specified space area, such that the second laser radar signal set is acquired, which is performed after irradiation with visible light. The characteristic that the laser radar has high sensitivity to small objects is helpful to capture more fine signals. Therefore, in the second sensing signal set, the second visible light signal set serves as a main data source, and the second millimeter-wave radar signal set and the second laser radar signal set serve as auxiliary signal sources (for acquiring information of the winged insects more accurately, which has a positive effect of promoting the spraying operation, including pest control, of the present application).

As described in the steps S7-S8, S7: the specified unmanned aerial vehicle is controlled to perform aerial spraying operation on the specified space area according to the first aerial spraying sub-strategy, wherein the minimum height of the touring robot on the overhead transmission line is greater than the maximum height of the specified unmanned aerial vehicle during aerial spraying operation; and S8: a preset spraying vehicle is controlled to perform cooperative ground spraying operation on the specified space area according to the first ground vehicle spraying sub-strategy so as to complete multilevel cooperative spraying operation. Since the first spraying strategy consists of a first aerial spraying sub-strategy and a first ground vehicle spraying sub-strategy which are completed by the unmanned aerial vehicle and the ground spraying vehicle respectively, the multilevel cooperative spraying operation may be completed by respectively performing the first aerial spraying sub-strategy and the first ground vehicle spraying sub-strategy. The first ground vehicle spraying sub-strategy is completed by the spraying vehicle, and the spraying vehicle may use any feasible mode during spraying operation, for example, spraying operation is performed by preset high-pressure atomized spraying equipment on the vehicle. In addition, the spraying vehicle of the present application may be applied to any feasible terrain, preferably hilly mountainous orchard terrain (hilly mountainous terrain), and the first ground vehicle spraying sub-strategy can associate with the prescription map, thereby realizing self-adaptive variable spraying based on the prescription map and different traveling speeds and planting densities, and finally completing unmanned aerial vehicle-ground cooperative accurate variable spraying operation in the hilly mountain area and orchard area.

According to the multilevel cooperation-based unmanned aerial vehicle spraying operation method provided by the present application acquires a first sensing signal set, the first sensing signal set is input into a prescription map generation model to acquire a first prescription map; the types of liquid medicine and corresponding quantity required by a to-be-treated plant are generated and a specified unmanned aerial vehicle is selected; a start instruction is transmitted to make the specified unmanned aerial vehicle fly to an initial position; a second sensing signal set is acquired; a motion parameter and a position parameter of the unmanned aerial vehicle, the remaining liquid storage quantity of the plurality of liquid medicine storage tanks and the second sensing signal set are input into a spraying strategy generation module for processing to acquire a first spraying strategy; aerial spraying operation is performed according to a first aerial spraying sub-strategy; and cooperative ground spraying operation is performed according to a first ground vehicle spraying sub-strategy so as to realize multilevel fine spraying operation based on the prescription map.

The embodiment of the present application provides a multilevel cooperation-based unmanned aerial vehicle spraying operation device, including:

a first sensing signal set acquisition unit, configured to acquire a first sensing signal set transmitted by a touring robot on an overhead transmission line, wherein the first sensing signal set is acquired by performing signal acquisition on a preset specified space area by a preset first sensor array on the touring robot, to-be-treated plants are planted in the specified space area, and the minimum height of the touring robot on the overhead transmission line is greater than the maximum height of all the to-be-treated plants in the specified space area;

a first prescription map acquisition unit, configured to input the first sensing signal set into a preset prescription map generation model based on a convolutional neural network for processing so as to acquire a first prescription map output by the prescription map generation model, wherein an initial position is marked in the first prescription map, the prescription map generation model is formed by training first training data collected in advance, the first training data consists of a first sensing signal set for training, a manually marked prescription map corresponding to the first sensing signal set for training and a manually marked initial position, and the first sensing signal set for training is acquired by a sensor array on the touring robot on the overhead transmission line;

a specified unmanned aerial vehicle selection unit, configured to generate the types of liquid medicine and the corresponding quantity required by the to-be-treated plants according to the first prescription map, and selecting a specified unmanned aerial vehicle from a preset unmanned aerial vehicle group according to the types of liquid medicine and the corresponding quantity required by the to-be-treated plants, wherein the specified unmanned aerial vehicle is applied to aerial spraying operation and is provided with liquid medicine spraying equipment and a plurality of liquid medicine storage tanks, and the number of the plurality of liquid medicine storage tanks is as same as that of the liquid medicine types;

a start instruction transmitting unit, configured to transmit a start instruction to a preset unmanned aerial vehicle terminal, such that the unmanned aerial vehicle terminal controls the specified unmanned aerial vehicle to take off to an initial position in a real space corresponding to the initial position marked in the first prescription map;

a second sensing signal set acquisition unit, configured to start a preset second sensor array on the specified unmanned aerial vehicle to perform signal acquisition on the specified space area so as to acquire a second sensing signal set;

a first spraying strategy acquisition unit, configured to acquire a motion parameter and a position parameter of the specified unmanned aerial vehicle and the remaining liquid storage quantity of the plurality of liquid medicine storage tanks, and input the motion parameter, the position parameter, the remaining liquid storage quantity of the plurality of liquid medicine storage tanks and the second sensing signal set into a preset spraying strategy generation model based on a BP neural network for processing so as to acquire a first spraying strategy output by the spraying strategy generation model, wherein the spraying strategy generation model is formed by training second training data collected in advance, the second training data consists of a motion parameter and a position parameter of the unmanned aerial vehicle for training, the remaining liquid storage quantity of the plurality of preset liquid medicine storage tanks on the unmanned aerial vehicle for training, a second sensing signal set for training and a corresponding manually marked spraying strategy, the second sensing signal set for training is acquired by a preset sensor array on the unmanned aerial vehicle for training, the first spraying strategy comprises a first aerial spraying sub-strategy and a first ground vehicle spraying sub-strategy, the first aerial spraying sub-strategy at least comprises an unmanned aerial vehicle flight speed changing over time, a flight position changing over time, parameters of liquid medicine spraying equipment changing over time and opening control parameters of the plurality of liquid medicine storage tanks changing over time;

an aerial spraying operation unit, configured to control the specified unmanned aerial vehicle to perform aerial spraying operation on the specified space area according to the first aerial spraying sub-strategy, wherein the minimum height of the touring robot on the overhead transmission line is greater than the maximum height of the specified unmanned aerial vehicle during aerial spraying operation; and a ground spraying operation unit, configured to control a preset spraying vehicle to perform cooperative ground spraying operation on the specified space area according to the first ground vehicle spraying sub-strategy so as to complete multilevel cooperative spraying operation.

Operations performed by the above units respectively are in one-to-one correspondence with the steps of the multilevel cooperation-based unmanned aerial vehicle spraying operation method in the above embodiments, which are not elaborated herein.

The multilevel cooperation-based unmanned aerial vehicle spraying operation device according to the present application acquires a first sensing signal set, inputs the first sensing signal set into a prescription map generation model to acquire a first prescription map, generates the type of liquid medicine and corresponding quantity required by a to-be-treated plant and selects a specified unmanned aerial vehicle, transmits a start instruction to make the specified unmanned aerial vehicle fly to an initial position, acquires a second sensing signal set, inputs a motion parameter and a position parameter of the unmanned aerial vehicle, the remaining liquid storage quantity of the plurality of liquid medicine storage tanks and the second sensing signal set into a spraying strategy generation module for processing to acquire a first spraying strategy, performs aerial spraying operation according to a first aerial spraying sub-strategy, and performs cooperative ground spraying operation according to a first ground vehicle spraying sub-strategy so as to realize multilevel fine spraying operation based on the prescription map.

Figure 2:
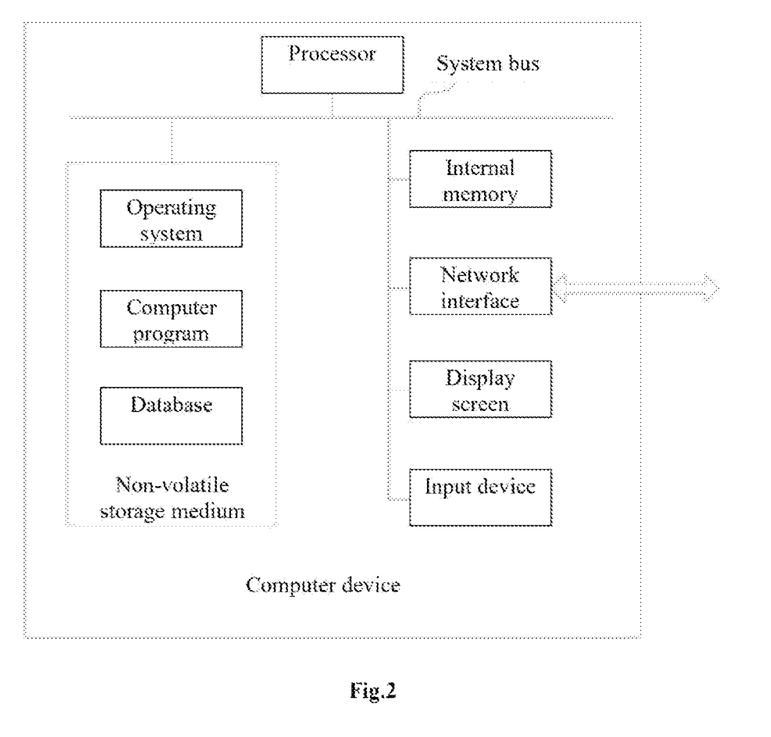
FIG. 2 is a structural schematic block diagram of a computer device according to an embodiment of the present application.

Referring to FIG. 2, the embodiment of the present invention further provides a computer device. The computer device may be a server, and an internal structure of the computer device may be as shown in the figure. The computer device includes a processor, a memory, a network interface and a database which are connected through a system bus. The processor of the computer device is configured to provide computing and control capabilities. The memory of the computer device includes a nonvolatile storage medium and an internal memory. The nonvolatile storage medium stores an operating system, a computer program, and a database. The internal memory provides an environment for operations of the operating system and the computer program in the nonvolatile storage medium. The database of the computer device is configured to store data used by the multilevel cooperation-based unmanned aerial vehicle spraying operation method. The network interface of the computer device is configured to communicate with an external terminal through a network. The computer program, when being executed by the processor, is configured to implement the multilevel cooperation-based unmanned aerial vehicle spraying operation method.

The processor performs the multilevel cooperation-based unmanned aerial vehicle spraying operation method, wherein the steps included in the method are respectively in one-to-one correspondence with the steps for performing the multilevel cooperation-based unmanned aerial vehicle spraying operation method in the above embodiments, which are not elaborated herein.

Those skilled in the art may understand that the structure shown in the figure is only a block diagram of a part of the structure related to the solution of the present invention and does not constitute a limitation to the computer device of the solution of the present application applied to the structure.

The computer device according to the present application acquires a first sensing signal set, inputs the first sensing signal set into a prescription map generation model to acquire a first prescription map, generates the type of medicine liquid and corresponding quantity required by a to-be-treated plant and selects an appointed unmanned aerial vehicle, transmits an enabled instruction to make the appointed unmanned aerial vehicle fly to an initial position, acquires a second sensing signal set, inputs a motion parameter and a position parameter of the unmanned aerial vehicle, the remaining liquid storage quantity of the plurality of medicine liquid storage tanks and the second sensing signal set into a spraying strategy generation module for processing to acquire a first spraying strategy, performs aerial spraying operation according to a first aerial spraying sub-strategy, and cooperates with ground spraying operation according to a first ground vehicle spraying sub-strategy so as to realize multilevel fine spraying operation based on the prescription map.

An embodiment of the present application further provides a computer readable storage medium, storing a computer program thereon. The computer program, when being executed by the processor, is configured to implement the multilevel cooperation-based unmanned aerial vehicle spraying operation method, wherein the steps included in the method are respectively in one-to-one correspondence with the steps for performing the multilevel cooperation-based unmanned aerial vehicle spraying operation method in the above embodiments, which are not elaborated herein.

The computer readable storage medium according to the present application acquires a first sensing signal set, inputs the first sensing signal set into a prescription map generation model to acquire a first prescription map, generates the type of liquid medicine and corresponding quantity required by a to-be-treated plant and selects a specified unmanned aerial vehicle, transmits a start instruction to make the specified unmanned aerial vehicle fly to an initial position, acquires a second sensing signal set, inputs a motion parameter and a position parameter of the unmanned aerial vehicle, the remaining liquid storage quantity of the plurality of liquid medicine storage tanks and the second sensing signal set into a spraying strategy generation module for processing to acquire a first spraying strategy, performs aerial spraying operation according to a first aerial spraying sub-strategy, and performs cooperative ground spraying operation according to a first ground vehicle spraying sub-strategy so as to realize multilevel fine spraying operation based on the prescription map.

Those of ordinary skill in the art can understand that all or some of processes for implementing the methods of the foregoing embodiments may be completed through a computer program or by instructing relevant hardware. The computer program may be stored in a nonvolatile computer readable storage medium. When the computer program is executed, processes of the embodiments of the foregoing methods may be included. For any reference used for a memory, a storage, a database, or other mediums used in the embodiments and provided by the present application may include a nonvolatile memory and/or a volatile memory. The nonvolatile memory may include a read-only memory (ROM), a programmable ROM (PROM), an electrical programmable ROM (EPROM), an electrical erasable programmable ROM (EEPROM) or a flash memory. The volatile memory may include a random access memory(RAM) or an external cache memory. As illustration rather than limitation, RAM may be obtained in various forms, for example, a static RAM (SRAM), a dynamic RAM (DRAM), a synchronous DRAM (SDRAM), a double data rate SDRAM (SSRSDRAM), an enhanced SDRAM (ESDRAM), a synchronous link (Synchlink) DRAM(SLDRAM), a memory bus (Rambus) direct RAM (RDRAM), a direct memory bus dynamic RAM (DRDRAM), a memory bus dynamic RAM (RDRAM), etc.

It should be noted that in the specification, the terms "include", "comprise" or any other variants thereof are intended to cover non-exclusive inclusion, such that a process, device, article or method including a series of elements not only includes those elements, but also includes other elements not explicitly listed, or further includes elements inherent to the process, device, article or method. In the absence of more restrictions, the element defined by the sentence "including a . . . " does not exclude the presence of other identical elements in the process, device, article or method including the element.

The above are only the preferred embodiments of the present application and do not limit the patent scope of the present application. Any equivalent structure or equivalent process transformation made by the contents of the specification and the drawings of the present application, or directly or indirectly applied to other related technical fields, are equally included in the patent protection scope of the present application.

The invention claimed is:

1. A multilevel cooperation-based unmanned aerial vehicle spraying operation method, comprising:
   S1: acquiring a first sensing signal set transmitted by a touring robot on an overhead transmission line, wherein the first sensing signal set is acquired by performing signal acquisition on a preset specified space area by a preset first sensor array on the touring robot, to-be-treated plants are planted in the specified space area, and the minimum height of the touring robot on the overhead transmission line is greater than the maximum height of all the to-be-treated plants in the specified space area;
   S2: inputting the first sensing signal set into a preset prescription map generation model based on a convolutional neural network for processing so as to acquire a first prescription map output by the prescription map generation model, wherein an initial position is marked in the first prescription map, the prescription map generation model is formed by training first training data collected in advance, the first training data consists of a first sensing signal set for training, a manually marked prescription map corresponding to the first sensing signal set for training and a manually marked initial position, and the first sensing signal set for training is acquired by a sensor array on the touring robot on the overhead transmission line;
   S3: generating the types of liquid medicine and the corresponding quantity required by the to-be-treated plants according to the first prescription map, and selecting a specified unmanned aerial vehicle from a preset unmanned aerial vehicle group according to the types of liquid medicine and the corresponding quantity required by the to-be-treated plants, wherein the specified unmanned aerial vehicle is applied to aerial spraying operation and is provided with liquid medicine spraying equipment and a plurality of liquid medicine storage tanks, and the number of the plurality of liquid medicine storage tanks is as same as that of the liquid medicine types;
   S4: transmitting a start instruction to a preset unmanned aerial vehicle terminal, such that the unmanned aerial vehicle terminal controls the specified unmanned aerial vehicle to take off to an initial position in a real space corresponding to the initial position marked in the first prescription map;
   S5: starting a preset second sensor array on the specified unmanned aerial vehicle to perform signal acquisition on the specified space area so as to acquire a second sensing signal set;
   S6: acquiring a motion parameter and a position parameter of the specified unmanned aerial vehicle and the remaining liquid storage quantity of the plurality of liquid medicine storage tanks, and inputting the motion parameter, the position parameter, the remaining liquid storage quantity of the plurality of liquid medicine storage tanks and the second sensing signal set into a preset spraying strategy generation model based on a BP neural network for processing so as to acquire a first spraying strategy output by the spraying strategy generation model, wherein the spraying strategy generation model is formed by training second training data collected in advance, the second training data consists of a motion parameter and a position parameter of the unmanned aerial vehicle for training, the remaining liquid storage quantity of the plurality of preset liquid medicine storage tanks on the unmanned aerial vehicle for training, a second sensing signal set for training and a corresponding manually marked spraying strategy, the second sensing signal set for training is acquired by a preset sensor array on the unmanned aerial vehicle for training, the first spraying strategy comprises a first aerial spraying sub-strategy and a first ground vehicle spraying sub-strategy, the first aerial spraying sub-strategy at least comprises an unmanned aerial vehicle flight speed changing over time, a flight position changing over time, parameters of liquid medicine spraying equipment changing over time and opening control parameters of the plurality of liquid medicine storage tanks changing over time;
   S7: controlling the specified unmanned aerial vehicle to perform aerial spraying operation on the specified space area according to the first aerial spraying sub-strategy, wherein the minimum height of the touring robot on the overhead transmission line is greater than the maximum height of the specified unmanned aerial vehicle during aerial spraying operation; and
   S8: controlling a preset spraying vehicle to perform cooperative ground spraying operation on the specified space area according to the first ground vehicle spraying sub-strategy so as to complete multilevel cooperative spraying operation.

2. The multilevel cooperation-based unmanned aerial vehicle spraying operation method according to claim 1, before the step S2: inputting the first sensing signal set into a preset prescription map generation model based on a convolutional neural network for processing so as to acquire a first prescription map output by the prescription map generation model, wherein an initial position is marked in the first prescription map, the prescription map generation model is formed by training first training data collected in advance, the first training data consists of a first sensing signal set for training, a manually marked prescription map corresponding to the first sensing signal set for training and a manually marked initial position, and the first sensing signal set for training is acquired by a sensor array on the touring robot on the overhead transmission line, the method comprising: S11: transferring a specified amount of sample data from a preset sample database to form a sample set, wherein the sample data consists of a sensing signal set for training, a corresponding manually marked prescription map and a manually marked initial position, the sensing signal set for training in the training data is acquired by performing signal acquisition process on a training area where plants are planted in advance by a high-altitude sensor array, and the high-altitude sensor array refers to a sensor array with a height greater than that of the plants in the training area during signal acquisition processing;

S12: dividing the sample set into a training set and a verification set according to a preset ratio;

S13: invoking a preset convolutional neural network model and inputting the training set into the convolutional neural network model for training so as to acquire an preliminary model;

S14: performing verification processing on the preliminary model by the verification set and judging whether the verification result is pass; and S15: if the verification result is pass, recording the preliminary model as a prescription map generation model.

3. The multilevel cooperation-based unmanned aerial vehicle spraying operation method according to claim 1, wherein the first prescription map consists of a plurality of spraying areas, each spraying area being correspondingly marked with the type of to-be-sprayed liquid medicine and the quantity of the to-be-sprayed liquid medicine; and the step S3: generating the types of liquid medicine and the corresponding quantity required by the to-be-treated plants according to the first prescription map, and selecting a specified unmanned aerial vehicle from a preset unmanned aerial vehicle group according to the types of liquid medicine and the corresponding quantity required by the to-be-treated plants, wherein the specified unmanned aerial vehicle is applied to aerial spraying operation and is provided with liquid medicine spraying equipment and a plurality of liquid medicine storage tanks, and the number of the plurality of liquid medicine storage tanks is as same as that of the liquid medicine types, comprises: S301: dividing the plurality of spraying areas in the first prescription area into a plurality of upper-layer areas and a plurality of lower-layer areas, the minimum height of the contour of the upper-layer areas being greater than a preset reference height, and other areas except for the upper-layer areas in the plurality of spraying areas in the first prescription map being the lower-layer areas, S302: constructing a first prescription sub-map only consisting of the plurality of upper-layer areas, and S303: generating the types of liquid medicine and the corresponding quantity required by the to-be-treated plants in the first prescription sub-map, and selecting a specified unmanned aerial vehicle from all the unmanned aerial vehicles in a distance away from the specified space area not exceeding a first preset distance, the specified unmanned aerial vehicle being applied to aerial spraying operation and being provided with liquid medicine spraying equipment and a plurality of liquid medicine storage tanks, the number of the plurality of liquid medicine storage tanks being as same as that of the liquid medicine types, and the remaining liquid storage quantity being correspondingly greater than the corresponding quantity of the types of the liquid medicine required by the to-be-treated plants in the first prescription sub-map.

4. The multilevel cooperation-based unmanned aerial vehicle spraying operation method according to claim 3, wherein the step S7: controlling the specified unmanned aerial vehicle to perform aerial spraying operation on the specified space area according to the first aerial spraying sub-strategy, wherein the minimum height of the touring robot on the overhead transmission line is greater than the maximum height of the specified unmanned aerial vehicle during aerial spraying operation, comprises:

S701: controlling the specified unmanned aerial vehicle to perform aerial spraying operation on the plurality of upper-layer areas according to the first aerial spraying sub-strategy, the minimum height of the touring robot on the overhead transmission line being greater than the maximum height of the specified unmanned aerial vehicle during aerial spraying operation, S702: after performing aerial spraying operation on all the upper-layer areas, judging whether the remaining liquid storage quantity of the plurality of liquid medicine storage tanks on the specified unmanned aerial vehicle is less than a preset liquid storage quantity threshold, and S703: if the remaining liquid storage quantity of the plurality of liquid medicine storage tanks on the specified unmanned aerial vehicle is less than a preset liquid storage quantity threshold, generating a ground spraying instruction, the ground spraying instruction being configured to indicate a spraying vehicle to perform spraying operation; and the step S8: controlling a preset spraying vehicle to perform cooperative ground spraying operation on the specified space area according to the first ground vehicle spraying sub-strategy so as to complete multilevel cooperative spraying operation, comprises:

S801: controlling a preset spraying vehicle to perform cooperative ground spraying operation on the plurality of lower-layer areas according to the first ground vehicle spraying sub-strategy so as to complete multilevel cooperative spraying operation.

5. The multilevel cooperation-based unmanned aerial vehicle spraying operation method according to claim 1, wherein the second sensor array consists of a visible light sensor sub-array, a millimeter-wave radar sub-array and a laser radar sub-array; and the step S5: starting a preset second sensor array on the specified unmanned aerial vehicle to perform signal acquisition on the specified space area so as to acquire a second sensing signal set, comprises:

S501: starting a preset light generator on the specified unmanned aerial vehicle to irradiate the specified space area with visible light, and starting a preset visible light sensor sub-array on the specified unmanned aerial vehicle to perform signal acquisition on the specified space area so as to acquire a second visible light signal set, S502: starting a preset millimeter-wavy radar sub-array on the specified unmanned aerial vehicle to perform signal acquisition on the specified space area so as to acquire a second millimeter-wave radar signal set, S503: starting a preset laser radar sub-array on the specified unmanned aerial vehicle to perform signal acquisition on the specified space area so as to acquire a second laser radar signal set, and S504: integrating the second visible light signal set, the second millimeter-wave radar signal set and the second laser radar signal into a second sensing signal set.

6. A multilevel cooperation-based unmanned aerial vehicle spraying operation device, comprising:

a first sensing signal set acquisition circuit, configured to acquire a first sensing signal set transmitted by a touring robot on an overhead transmission line, wherein the first sensing signal set is acquired by performing signal acquisition on a preset specified space area by a preset first sensor array on the touring robot, to-be-treated plants are planted in the specified space area, and the minimum height of the touring robot on the overhead transmission line is greater than the maximum height of all the to-be-treated plants in the specified space area;

a first prescription map acquisition circuit, configured to input the first sensing signal set into a preset prescription map generation model based on a convolutional neural network for processing so as to acquire a first prescription map output by the prescription map generation model, wherein an initial position is marked in the first prescription map, the prescription map generation model is formed by training first training data collected in advance, the first training data consists of a first sensing signal set for training, a manually marked prescription map corresponding to the first sensing signal set for training and a manually marked initial position, and the first sensing signal set for training is acquired by a sensor array on the touring robot on the overhead transmission line;

a specified unmanned aerial vehicle selection circuit, configured to generate the types of liquid medicine and the corresponding quantity required by the to-be-treated plants according to the first prescription map, and selecting a specified unmanned aerial vehicle from a preset unmanned aerial vehicle group according to the types of liquid medicine and the corresponding quantity required by the to-be-treated plants, wherein the specified unmanned aerial vehicle is applied to aerial spraying operation and is provided with liquid medicine spraying equipment and a plurality of liquid medicine storage tanks, and the number of the plurality of liquid medicine storage tanks is as same as that of the liquid medicine types;

a start instruction transmitting circuit, configured to transmit a start instruction to a preset unmanned aerial vehicle terminal, such that the unmanned aerial vehicle terminal controls the specified unmanned aerial vehicle to take off to an initial position in a real space corresponding to the initial position marked in the first prescription map;

a second sensing signal set acquisition circuit, configured to start a preset second sensor array on the specified unmanned aerial vehicle to perform signal acquisition on the specified space area so as to acquire a second sensing signal set;

a first spraying strategy acquisition circuit, configured to acquire a motion parameter and a position parameter of the specified unmanned aerial vehicle and the remaining liquid storage quantity of the plurality of liquid medicine storage tanks, and input the motion parameter, the position parameter, the remaining liquid storage quantity of the plurality of liquid medicine storage tanks and the second sensing signal set into a preset spraying strategy generation model based on a BP neural network for processing so as to acquire a first spraying strategy output by the spraying strategy generation model, wherein the spraying strategy generation model is formed by training second training data collected in advance, the second training data consists of a motion parameter and a position parameter of the unmanned aerial vehicle for training, the remaining liquid storage quantity of the plurality of preset liquid medicine storage tanks on the unmanned aerial vehicle for training, a second sensing signal set for training and a corresponding manually marked spraying strategy, the second sensing signal set for training is acquired by a preset sensor array on the unmanned aerial vehicle for training, the first spraying strategy comprises a first aerial spraying sub-strategy and a first ground vehicle spraying sub-strategy, the first aerial spraying sub-strategy at least comprises an unmanned aerial vehicle flight speed changing over time, a flight position changing over time, parameters of liquid medicine spraying equipment changing over time and opening control parameters of the plurality of liquid medicine storage tanks changing over time;

an aerial spraying operation circuit, configured to control the specified unmanned aerial vehicle to perform aerial spraying operation on the specified space area according to the first aerial spraying sub-strategy, wherein the minimum height of the touring robot on the overhead transmission line is greater than the maximum height of the specified unmanned aerial vehicle during aerial spraying operation; and a ground spraying operation circuit, configured to control a preset spraying vehicle to perform cooperative ground spraying operation on the specified space area according to the first ground vehicle spraying sub-strategy so as to complete multilevel cooperative spraying operation.

* * * * *